L. B. HARRIS.
IRRIGATING APPARATUS.
APPLICATION FILED NOV. 28, 1910.
994,155.
Patented June 6, 1911.
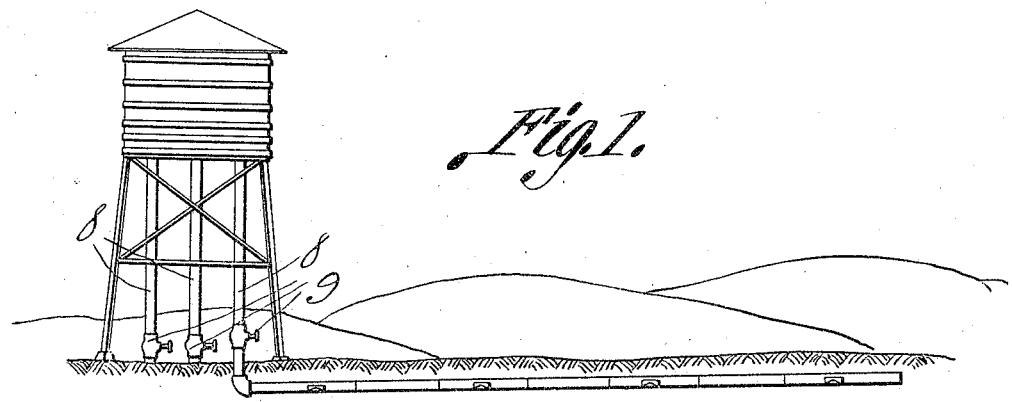
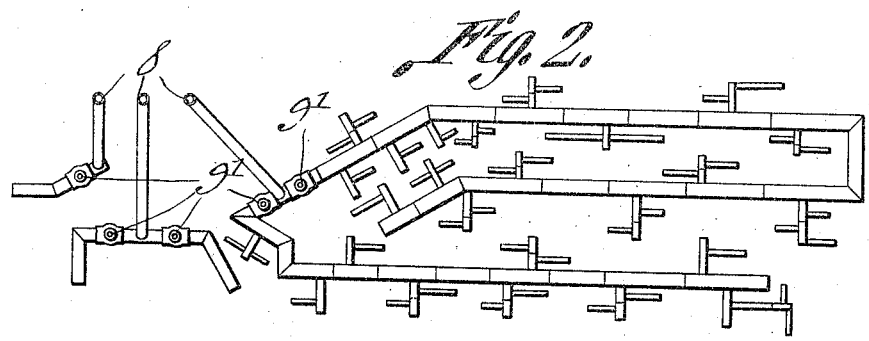
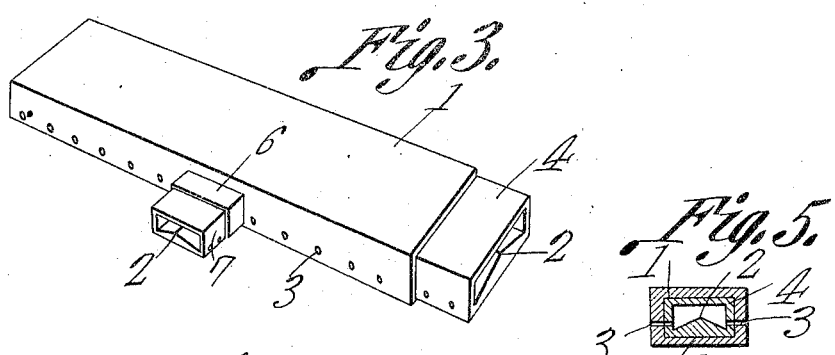
Witnesses
L. B. Harris, Inventor
by Attorneys

UNITED STATES PATENT OFFICE.

LEROY B. HARRIS, OF BELTON, MISSOURI.

IRRIGATING APPARATUS.

994,155.  Specification of Letters Patent.  Patented June 6, 1911.

Application filed November 28, 1910. Serial No. 594,532.

*To all whom it may concern:*

Be it known that I, LEROY B. HARRIS, a citizen of the United States, residing at Belton, in the county of Cass and State of Missouri, have invented a new and useful Irrigating Apparatus, of which the following is a specification.

This invention relates to irrigating apparatus and its object is to provide a conduit adapted to be embedded below the surface of the soil and which consists of interfitting sections of novel form, said sections being so constructed as to spread the water therein to both sides of the sections and to the discharge openings within said sides.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings the preferred form of the invention has been shown.

In said drawings:—Figure 1 is an elevation of a conduit constructed in accordance with the present invention, the same being shown embedded in the ground and connected to a supply tank. Fig. 2 is a plan view of one arrangement of conduits. Fig. 3 is a perspective view of a conduit section. Fig. 4 is a central vertical longitudinal section through one complete conduit section and through a portion of an adjoining section engaging the same. Fig. 5 is an enlarged section on line A—B Fig. 4.

Referring to the figures by characters of reference, 1 designates a conduit section preferably rectangular and formed of terra-cotta, cement, wood or any other material desired, said section being formed, along the bottom thereof, with a central longitudinally extending ridge 2 from which the upper faces of the bottom of the section diverge downwardly to the sides of the section where outlet openings 3 are formed in the side walls. One end portion of the section is preferably reduced transversely to form an extension 4 while the other end thereof has a countersink 5 so proportioned as to receive snugly the extension 4 of an adjoining conduit section. The apertures 3 are spaced apart at regular intervals so that when two or more conduit sections are assembled by placing the extensions 4, within the recesses 5, the openings within the extensions will register with the corresponding openings within the walls of the recesses.

Certain of the sections 1 may be formed with one or more rectangular arms extending therefrom at desired angles, one of these arms being shown at 6 in Fig. 3. Each arm has a reduced end portion forming an extension 7 and the walls of the arm and extension are formed with outlet openings corresponding with the openings 3. The bottom of each of these arms is also shaped to correspond with the bottom of the conduit section 1.

The extensions 7 are adapted to engage smaller conduit sections similar to the sections 1.

It will be apparent that by providing conduit sections such as described and by forming them with arms extending at different angles, the said conduits can be assembled to form any configuration desired and to cover any predetermined area. The larger sections 1, when assembled, form the main distributing pipes while the arms 6 and the smaller conduit sections connected thereto, form the branch pipes. The main distributing pipes are supplied, through pipes 8 having valves 9, from a tank or other source and valves 9' may be arranged within the main distributing pipes close to the supply pipes 8 for the purpose of controlling the distribution of the water upon leaving the pipes 8.

As has heretofore been stated the conduit sections are to be placed below the surface of the soil and as they are flat and rectangular in cross section, they can be buried without the necessity of digging a ditch of any considerable depth. The various sections can be assembled without the use of special tools and can be held together by the means of cement or the like, or, if preferred, can remain unsecured.

When water is admitted to the conduits, it flows through the main distributing pipes, and is distributed laterally by the inclined faces of the bottoms of the sections and discharged through the openings 3 into the subsoil. As the openings 3 are located in the side walls of the sections, the water will flow freely through them. As only a comparatively small percentage of the water within the main conduits can escape through the openings 3 while the water is circulating, the remainder of the water will be directed into the branch conduits and discharged therefrom through the openings therein. As has already been pointed out the various conduits can be extended in any direction desired and it will be seen, therefore, that by admitting water to them, a large area can be supplied or irrigated.

It will be seen that by utilizing the conduit herein described, the proper distribution of water may be effected without the necessity of first leveling the surface of the ground.

What is claimed is:—

1. Irrigating apparatus including a conduit adapted to be embedded below the surface of the soil and made up of interfitting flat sections each formed in a single piece and having outlet openings in the sides thereof, the bottom of each section having its upper surface formed of downwardly diverging faces extending from a central ridge and toward the openings, said faces being interposed between the side walls of the sections.

2. Irrigating apparatus including a conduit adapted to be embedded below the surface of the soil and consisting of sections each having a recess in one end and an extension at its other end, each extension being insertible into the recess in an adjoining section, there being outlet openings in the sides of the sections, the bottom of each section having downwardly diverging upper faces interposed between the sides of the sections and forming a central longitudinal ridge and constituting water spreading means.

3. Irrigating apparatus including a conduit made up of flat rectangular sections having outlet openings in the side walls thereof, each section having a recess in one end and an extension at its other end, the bottom of each section having downwardly diverging upper faces extending from the inner end of the recess to the outer end of the extension and forming a central longitudinal ridge and constituting water spreading means.

In testimony that I claim the foregoing as my own, I have hereto affixed my signature in the presence of two witnesses.

LEROY B. HARRIS.

Witnesses:
W. F. BURKHART,
T. P. GREEN.